Figure 1:
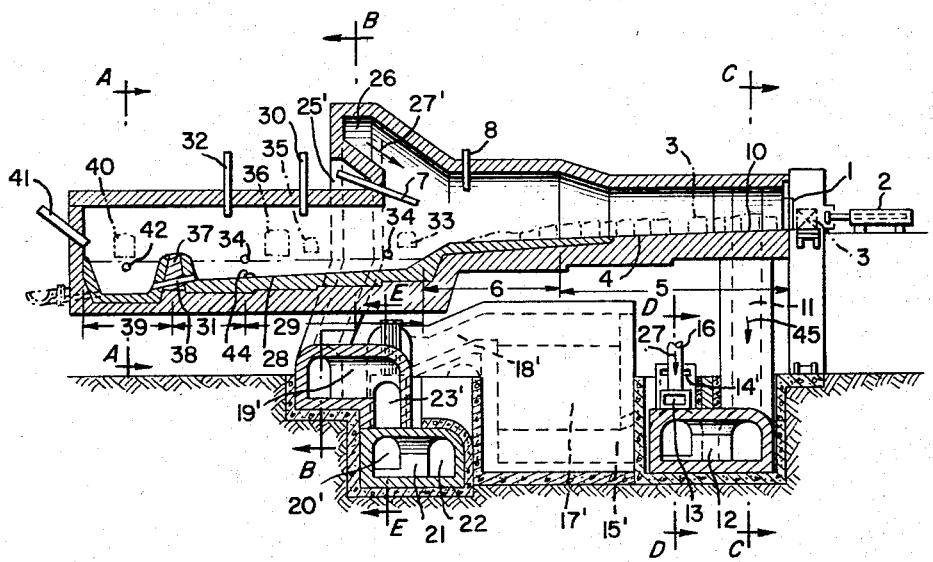

Nov. 22, 1966   TSUYOSHI KAI ET AL   3,287,006
CONTINUOUS STEEL MAKING FURNACE
Filed April 8, 1963   2 Sheets-Sheet 1

INVENTORS
TSUYOSHI KAI
TATSUO SHIBATA

BY Wenderoth, Lind & Ponack

ATTORNEYS

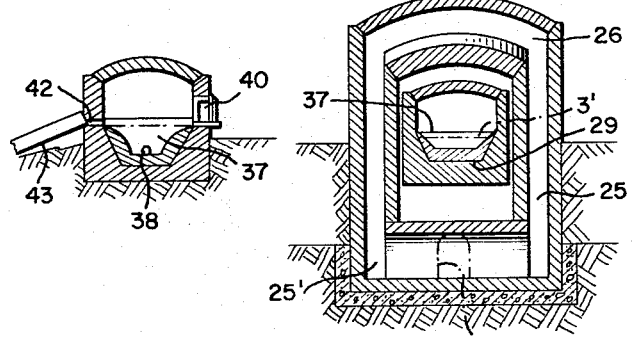
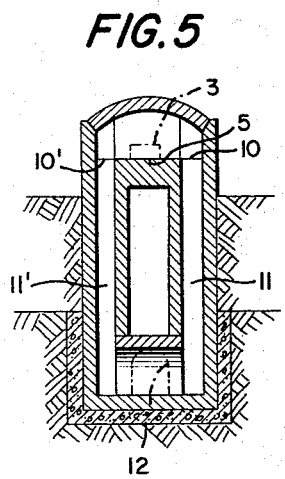
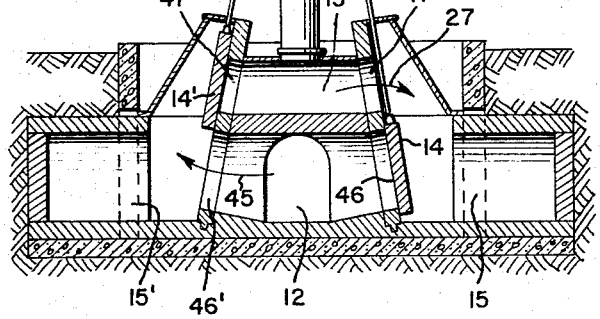
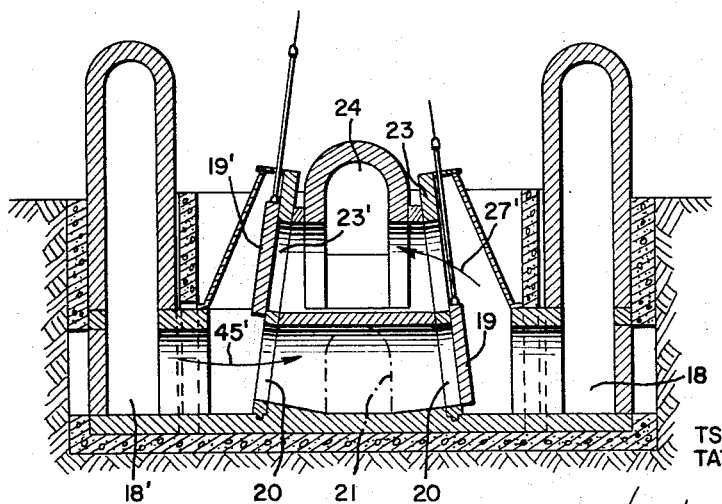

United States Patent Office 3,287,006
Patented Nov. 22, 1966

3,287,006
CONTINUOUS STEEL MAKING FURNACE
Tsuyoshi Kai, Yawata, and Tatsuo Shibata, Orio-Honjo, Japan, assignors to Yawata Iron & Steel Co., Ltd., Tokyo, Japan, a corporation of Japan
Filed Apr. 8, 1963, Ser. No. 271,118
2 Claims. (Cl. 266—11)

This invention relates to a steel making furnace which can be continuously operated from the charging of a raw material to the tapping of a molten steel.

Inherently in the continuous pig iron-steel operation, it is very important that the balance between the respective steps should be maintained. However, under various conditions in the operation, it may be necessary to make considerable adjustment between them.

One of the causes is the fact that the steel making steps or the various types of steel making furnace are parts of a noncontinuous production system. Such a noncontinuous system of steel making steps is also a factor inhibiting the increase of the efficiency and the stabilization of the quality of the product.

An object of the present invention is to eliminate the defects caused by the noncontinuity of any existing steel making method and to continuously produce a molten steel of a stabilized quality.

The present invention is characterized by first moving a charged raw material into the furnace while heating it with excess heat in the furnace, melting or half-melting it with fuel and oxygen burners, heating the molten raw material by leading it to a fusing zone, adding the molten pig iron and such flux as lime and an auxiliary raw material to the melt in the fusing zone, heating and refining the melt, and then leading it into a finishing step in turn, finally refining it by adjusting the composition and temperature and then tapping it.

The apparatus of the present invention is characterized by having (1) a heating zone for a charged raw material having a raw material charging opening, (2) a melting zone having fuel and oxygen burners and (3) a fusing zone having a molten pig iron and auxiliary raw material charging opening and a slag removal opening in proper places and having combustion and oxygen blowing burners. (4) a refining zone following said fusing zone and (5) a finishing zone separated from the refining zone by a partition wall provided with a molten steel passing hole, and said respective zones have bottoms which slope downwardly.

Thus, in the present invention, because each process from the preheating of the raw material to the tapping of the molten steel can be properly adjusted in the respective zone, local damage of the furnace can be prevented and, due to the series of the continuous processes, the heat in the furnace can be well utilized, the temperature can be made uniform and the composition can be uniformly adjusted.

The other objects and effects of the present invention will become clear from the following specification.

The present invention shall be explained with reference to an embodiment illustrated in the drawings.

Figure 2:
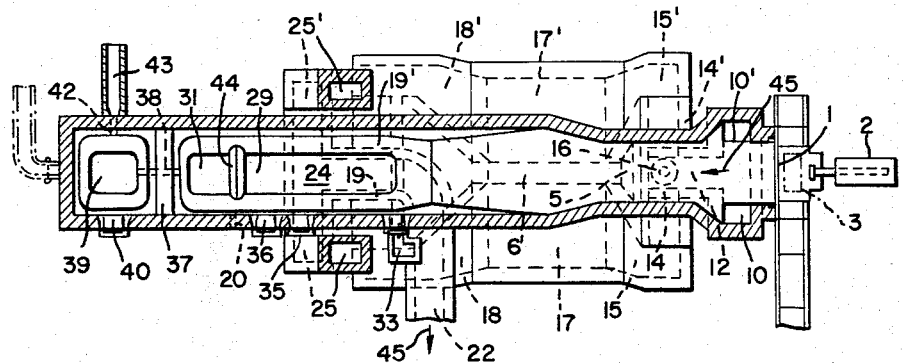

FIGURE 1 is an elevation of a continuous steel making furnace according to the present invention.
FIGURE 2 is a plan view of the same.
FIGURE 3 is a cross-sectional view on line A—A in FIGURE 1.
FIGURE 4 is a cross-sectional view on line B—B in FIGURE 1.
FIGURE 5 is a cross-sectional view on line C—C in the same.
FIGURE 6 is a cross-sectional view on line D—D in the same.
FIGURE 7 is a cross-sectional view on line E—E in the same.

A charging opening 1 is at one end of the furnace illustrated in FIGURES 1 and 2. A raw material scrap 3 conveyed to a position in front of said charging opening 1 is fed into the furnace by means a pushing plunger 2. In this embodiment, the scrap 3 is continuously conveyed to the opening 1 by means of a conveyor and, in order to prevent the entry of outside air, said charging opening has double doors. The scrap 3 pushed into the furnace moves along a hearth 4 having a slight downward slope. The part 5 of the furnace is to elevate the temperature of the scrap 3 by utilizing the excess heat of the waste gas and is called a heating zone. The scrap 3 passing through the heating zone 5 is gradually heated to a high temperature and moves further into the furnace. A combustion burner 7 is set near the furnace zone 6. The scrap 3 is further heated and melted by the combustion heat of the burner. This zone 6 is called a melting zone. An oxygen burner 8 for burning the unburnt portion of the waste gas is positioned in the upper part of the melting zone. A port 26 for preheated air 27' (indicated by the arrow) for burning a fuel is located near the combustion burner 7. Said melting zone is the zone wherein scrap charged and preheated in the heating zone is further heated to melt or half-melt the same, but refining reactions such as dephosphorization and desulfurization are not carried out. Suction ports 10 and 10' for a waste gas 45 (indicated by the arrow) are made on both sides of the part of the furnace closest to the charging opening 1 of the heating zone 5. Said suction ports 10 and 10' lead to regenerators 17 and 17' through descending passages 11 and 11', a lateral passage 12 and reversing valves 14 and 14', respectively. Further, an air suction port 16 leads to regenerators 17 and 17' through a lateral passage 13 and a first reversing valve means in the form of reversing valves 14 and 14', respectively. The reversing valves 14 and 14' are change-over devices for alternately feeding to the regenerators 17 and 17' the waste gas 45 passing through the descending passages 11 and 11' and lateral passage 12 and cold air 27 (indicated by the arrow) drawn through the air suction port 16, respectively as shown in FIGURE 6. That is to say, by sliding the reversing valves 14 and 14', ports 47 and 47' through which the air suction port 16 communicates with the regenerators and ports 46 and 46' through which the lateral passage 12 communicates with the regenerators will be opened or closed accordingly.

Said regenerators 17 and 17' communicate with rising passages 25 and 25' and a flue 22 through additional passages 18 and 18' and a second reversing valve means in the form of reversing valves 19 and 19', respectively.

Said reversing valves 19 and 19' are change-over devices for leading the waste gas 45' and the preheated air 27' which alternately pass through the additional passages 18 and 18', to the flue 22 or the rising passages 25 and 25', respectively.

That is to say, by sliding the reversing valves 19 and 19' as shown in FIGURE 7, ports 20 and 20' leading to the flue 22 and ports 23 and 23' leading to the rising passages 25 and 25' will be opened or closed, respectively.

The flow of the waste gas and air in the apparatus with the parts in the positions shown in the drawings shall be explained. In FIGURES 5 and 6, the waste gas 45 from the lateral passage 12 is led to the lateral passage 15', past the reversing valve 14' and is sent to the regenerator 17' to give heat to said regenerator. The waste gas 45' which has exchanged heat is sent into the lateral passage 21 and further into the flue 22 through the lateral passage 18' past the reversing valve 19' as shown in FIGURE 7. On the other hand, the cold air 27 fed through the air suction port 16 is led to the lateral passage 15 from the lateral passage 13 (see FIGURE 6), is sent to the regenerator 17, absorbing heat therein, is then led as preheated air 27' to the rising passages 25 and 25' through the lateral passage 24 from the lateral passage 18 and is sent into the furnace through the jetting port 26. (See FIGURE 4.)

The above mentioned heat exchange operation is carried out alternately in the two regenerators by operating the reversing valves.

Then the raw material melted in the melting zone 6 flows to a hearth 28 through a rather steeply sloped hearth between the melting zone 6 and the furnace part 29 following it. As the hearth 28 is also slightly downwardly sloped, the molten raw material 3 constantly flows into the hearth 28 from the hearth 4. Because the raw material melted in the melting zone 6 is still at a comparatively low temperature and low in fluidity, the slope of the hearth 4 is a little larger than that of the hearth 28. The rather steeply sloped part is provided between the hearths 4 and 28 because in the next part 29 the molten raw material is to be contained and molten pig iron is to be fed in, as described later, so as to form a so-called molten bath and to that end some head is required. This part 29 of the furnace is called a fusing zone. A slight projection 44 is provided between said fusing zone 29 and the furnace part 31 following it to prevent the molten steel having a comparatively low temperature because it is in contact with the hearth 28 in the fusing zone 29 from flowing into the part 31 and to facilitate the stirring thereof. This part 31 is called a refining zone. In said fusing zone 29 and refining zone 31, there are carried out such operations as making uniform the rise of the temperature of the molten raw material and adjusting the composition of the contents. That is to say, in the fusing zone the melt which is at a low temperature is heated further to bring the same to the completely melted state and at the same time a slag is formed by adding the flux such as lime and molten pig iron is poured in, thereby agitating the molten material and also the refining actions such as dephosphorization, desulfurization and decarburization are partly carried out, and in the refining zone is carried out the refining substantially corresponding to the that during the final period of refining in the conventional open-hearth furnace. In order to carry out the operations in these zones burners 30 and 32 for both combustion and oxygen blowing are mounted in the upper parts of the fusing zone 29 and refining zone 31, respectively, and also a molten pig iron charging opening 33, slag withdrawal opening 34, auxiliary raw material charging opening 35 and operating opening 36 for feeding scraps or operating the furnace are provided in those zones. Because considerable reactions such as mixing of the molten scrap and molten pig iron and slagging of the added medium flux are carried out in said fusing zone 29, this zone 29 has sufficient space so that its length will have no unfavorable influence on the subsequent refining zone 31. In the fusing zone 29, a considerable rise of temperature takes place and also considerable decarburization is carried out. In the refining zone 31, the compositions of the molten steel and slag are investigated, any required flux is added through the operating opening 36 and the temperature of the steel bath is adjusted by the burner 32. The molten steel contained in the refining zone 31 is adjusted so that it is substantially that of the composition which is being made and is sent to a finishing zone 39 following the refining zone 31. In this finishing zone the preliminary deoxidation and desired deoxidation are carried out. A dam 37 is positioned between the refining zone 31 and finishing zone 39. The molten steel in the refining zone 31 and that in the finishing zone 39 communicate with each other through a passing hole 38 so that, as the molten steel in the finishing zone 39 is tapped and decreased, the molten steel in the refining zone 31 can continuously flow into the finishing zone 39. In zone 39 are an operating opening 40, a burner for the adjustment of the temperature of the molten steel, a tapping hole 42 and a tapping trough 43 connected to said tapping hole. In this part, an alloy iron is partially added, the gas contained in molten steel is removed, nonmetallic impurities are made to float up and the final temperature adjustment is made. Because the finishing zone is separated from the refining zone, as above mentioned, it is also possible to cover the molten steel by a slag having a weak oxidzing property. Further, as seen in FIGURES 1 and 2, the tapping port 42 through which the refined and finished steel bath is to be tapped is located in the upper part of the steel bath. Therefore, if there were no dam 37 between the refining zone 31 and the finishing zone 39, only the upper surface of the steel bath would flow out and the object of the present equipment would not be attained. It is necessary here that the cross-sectional area of the passing hole 38 should be larger than that of the tapping hole 42.

It is, of course, possible to continuously tap the molten steel. However, it is also possible to tap it at regular intervals depending on the pit side equipment.

Because, in the apparatus of the present invention, the melting zone, fusing zone, refining zone and finishing zone are separated from one another, each zone is provided with a burner and operating opening, therefore the melt can be adjusted so that the best composition in each zone can be obtained and thus a favorable steel can be obtained.

As regards the operation of the above described continuous steel making furnace, an example for a 10-ton furnace shall be expained.

First of all, scrap 3 which was shaped by being pressed in advance was pushed in at regular intervals by means of the plunger 2. (1 block of the scrap having dimensions of 1500 x 600 x 2000 mm. weighed 1 ton. 1 block was pushed in every 10 minutes or 6 tons per hour.) While the thus fed scrap 3 gradually moved through the heating zone 5 to the melting zone 6, it was heated to above 1000° C. by a heat input of about 7,100,000 kcal./hr. obtained by burning with auxiliary oxygen jetted in through the oxygen burner 8 a heavy oil (heat content 5,900,000–6,000,000 kcal./hr. at 610 liters/hr.) from the combustion burner and CO gas (heat content 1,000,000 kcal./hr. at 550 m.$^3$/hr.) produced from the fusing and refining zones. The heated and melted scrap 3 flowed down the hearth 4 to the hearth 28. When it reached the fusing zone 29, it had substantially melted. It was further heated by the combustion heat and was completely melted. In said melting zone 29, molten pig iron was fed in at a rate of 6 tons per hour through the pouring opening 33. Also slag forming materials, limestone and burnt lime, were thrown in at the rates of 100 and 300 kg./hr., respectively, through the auxiliary raw material charging opening 35. Oxygen was jetted in through the burner 30 for both combustion and oxygen blowing provided in the upper part of said fusing zone 29 to carry out decarburization and temperature elevation. Further, the temperature of the molten steel was adjusted so that it was above 1600° C. by jetting in oxygen through the burner 32 in the upper part of the refining zone 31. The composition was adjusted by throwing in auxiliary raw materials through the operating opening 36. The input rates of oxygen through the nozzles 30 and 32 were 200 and 300 m.$^3$/hr., respectively. Further, as the rate of the molten pig iron was about 50%, a basicity of more than 30 could be maintained with 100 kg./hr. of limestone and 300 kg./hr. of quicklime. In the case of this example, the discharged slag through the slag discharging port 34 was at a rate of 1.5 tons/hr.

After a carbon content of 0.25% and temperature of 1615° C. were reached in the refining zone 31, the molten steel was made to flow into the finishing zone 39 through the passing hole 38, and the temperature was finely adjusted to 1610° C. by jetting in 100,000 kcal./hr. of heavy oil and 7 m.$^3$/hr. of oxygen through the molten steel temperature adjusting burner 41 and the composition was adjusted so as to be C 0.20%, Mn 0.45%, S 0.025% and P 0.015% by inserting a ferro-alloy through the operating opening 40. The amount of steel tapped was 10.5 tons/hr.

When the proper operation was carried out by using such equipment as described above, the temperature of each part within the furnace was substantially uniform, the effect of preheating was high, no local damage of the furnace body occurred, the temperature and composition of the molten steel were gradient and were respectively uniform in each part and a molten steel of a stablized quality could be continuously tapped.

As described above, the present invention has various effects. Among them, the most prominent is that heat can be utilized to the maximum extent. That is to say, the input heat can be increased by burning the CO gas produced in the refining zone and fusing zone, even the cold material just inserted can be heated well by bringing the high temperature combustion gas produced in the central part of the furnace into contact with the entire scrap iron by providing the combustion gas suction port near the scrap iron inserting port, and air can be well and smoothly preheated by means of the special regenerative furnaces according to the present invention.

What is claimed is:

1. A continuous steel making furnace comprising a charged raw material heating zone having a charging opening opening into it and having two combustion gas suction ports therein near said charging opening, a melting zone connected to said heating zone and having an upper portion having an oxygen burner, a combustion burner and a preheated air port therein, a fusing zone connected to said melting zone and a refining zone having a molten pig iron charging port, an auxiliary raw material charging port, an operation charging opening and a slag removal opening therein, said fusion zone and refining zone each having at least one burner in an upper portion thereof, a slight projection between said fusion zone and refining zone for partitioning said zones from each other, a finishing zone connected to said refining zone and having an operation opening, a tapping hole and a molten steel temperature adjusting burner therein, a partition wall between said refining zone and said finishing zone having a molten steel passing hole in the lower part thereof, the bottom surfaces of said zones being sloped downwardly from said charging opening to said tapping hole.

2. A continuous steel making furnace as claimed in claim 1, further comprising two regenerators, an intake passage leading into each of said regenerators, at least one descending passage extending from the combustion gas suction ports in said raw material heating zone and a lateral passage into which said descending passage opens, air suction ports adjacent said lateral passage, a first changeover valve means between said lateral passage, said air suction ports and said intake passages for changing over the intake passages from air to combustion gas and combustion gas to air, a combustion gas flue, at least one rising passage extending to said preheated air port in said upper portion of said melting zone, an additional passage leading from each of said regenerators, and a second changeover valve means between said additional passages and said flue and said rising passage for changing over one of the additional passages from communication with the flue to the rising passage and the other from communication with the rising passage to the flue and vice versa.

References Cited by the Examiner
UNITED STATES PATENTS

| 2,034,071 | 3/1936 | Wickland | 266—24 |
| 3,171,877 | 3/1965 | Thring | 266—11 |

JOHN F. CAMPBELL, *Primary Examiner.*

M. L. FAIGUS, *Assistant Examiner.*